(12) United States Patent
Ciochina et al.

(10) Patent No.: US 12,289,150 B2
(45) Date of Patent: Apr. 29, 2025

(54) ACCESS POINTS, STATION AND CORRESPONDING METHODS

(71) Applicant: Sony Group Corporation, Tokyo (JP)

(72) Inventors: Dana Ciochina, Stuttgart (DE); Thomas Handte, Stuttgart (DE); Kazuyuki Sakoda, Stuttgart (DE); Kosuke Aio, Stuttgart (DE); Hiromasa Uchiyama, Stuttgart (DE); Yusuke Tanaka, Stuttgart (DE); Ken Tanaka, Stuttgart (DE); Ryuichi Hirata, Stuttgart (DE); Mohamed Aboulseoud, Stuttgart (DE); Qing Xia, Stuttgart (DE); Liangxiao Xin, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 74 days.

(21) Appl. No.: 17/917,567

(22) PCT Filed: Mar. 23, 2021

(86) PCT No.: PCT/EP2021/057419
§ 371 (c)(1),
(2) Date: Oct. 7, 2022

(87) PCT Pub. No.: WO2021/209233
PCT Pub. Date: Oct. 21, 2021

(65) Prior Publication Data
US 2023/0141111 A1    May 11, 2023

(30) Foreign Application Priority Data

Apr. 17, 2020  (EP) .................................. 20170220

(51) Int. Cl.
*H04B 7/06*        (2006.01)

(52) U.S. Cl.
CPC ......... *H04B 7/0617* (2013.01); *H04B 7/0626* (2013.01)

(58) Field of Classification Search
CPC ........................... H04B 7/0617; H04B 7/0626
(Continued)

(56) References Cited

U.S. PATENT DOCUMENTS

| 2014/0086200 A1* | 3/2014 | Seok ..................... H04L 5/0096 370/330 |
| 2017/0188376 A1 | 6/2017 | Noh et al. |

(Continued)

FOREIGN PATENT DOCUMENTS

| WO | 2019069670 A1 | 4/2019 |
| WO | 2021/089674 A1 | 5/2021 |

OTHER PUBLICATIONS

International Search Report and Written Opinion mailed on Jul. 14, 2021, received for PCT Application PCT/EP2021/057419, filed on Mar. 23, 2021, 12 pages.

(Continued)

*Primary Examiner* — Leila Malek
(74) *Attorney, Agent, or Firm* — XSENSUS LLP

(57) ABSTRACT

A first access point comprises circuitry configured to perform a sounding procedure with one or more first stations associated with the first access point and configured to communicate with the first access point over a respective channel to determine resource unit allocation and beamforming configuration for use in subsequent communication with respective first stations, and to transmit a training data unit containing signaling information related to the determined resource unit allocation and related to the determined beamforming configuration, wherein the training data unit is
(Continued)

transmitted with a beamforming configuration derived from the determined resource unit allocation and the determined beamforming configuration.

20 Claims, 10 Drawing Sheets

(58) Field of Classification Search
USPC .......................................................... 375/267
See application file for complete search history.

(56) References Cited

U.S. PATENT DOCUMENTS

| | | |
|---|---|---|
| 2018/0206274 A1 | 7/2018 | Cherian et al. |
| 2018/0292518 A1* | 10/2018 | Chu .................... H04W 72/121 |
| 2019/0045366 A1* | 2/2019 | Vermani ............... H04W 16/06 |

OTHER PUBLICATIONS

IEEE, "Part 11: Wireless LAN Medium Access Control (MAC) and Physical Layer (PHY) Specifications", IEEE Computer Society, IEEE Std 802.11™-2016, Dec. 7, 2016, pp. 1-3532.

Office Action issued Feb. 12, 2025 in Japanese Patent Application No. 2022-561187.

* cited by examiner

ACCESS POINTS, STATION AND CORRESPONDING METHODS

CROSS-REFERENCE TO RELATED APPLICATIONS

The present application is based on PCT filing PCT/EP2021/057419, filed Mar. 23, 2021, which claims priorities to EP 20170220.6, filed on Apr. 17, 2020, the entire contents of each are incorporated herein by reference.

BACKGROUND

Field of the Disclosure

The present disclosure relates to different access points, a station and corresponding methods.

Description of Related Art

Low latency or real time applications have stringent requirements on fast or periodic channel access. For example, within one WLAN Basic Service Set (BSS; also called cell hereinafter), in which one or more stations (STAs) are associated with one access point (AP) serving the one or more STAs, these requirements are relatively easy to achieve. However, this is no longer the case when STAs are within the range of multiple overlapped BSSs (OBSS), managed by different APs, with which one or more other STAs are associated in the respective other BSS(s). One or more of the other STAs, also called overlapping STAs (oSTAs), associated with another AP serving another BSS are then in the range of the AP serving the one or more STAs.

Spatial reuse (SR) techniques are defined in the upcoming 802.11ax amendment of the IEEE 802.11 standard. These allow oSTAs from overlapped BSSs to transmit during a time interval scheduled by an AP as long as the interference at the AP can be guaranteed to be lower than a tolerable level.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide access points that enable enhanced downlink spatial reuse. It is a further object to provide corresponding methods as well as a corresponding computer program and a non-transitory computer-readable recording medium for implementing said methods.

According to an aspect there is provided a first access point comprising circuitry configured to
  perform a sounding procedure with one or more first stations associated with the first access point and configured to communicate with the first access point over a respective channel to determine resource unit allocation and beamforming configuration for use in subsequent communication with respective first stations; and
  transmit a training data unit containing signaling information related to the determined resource unit allocation and related to the determined beamforming configuration, wherein the training data unit is transmitted with a beamforming configuration derived from the determined resource unit allocation and the determined beamforming configuration.

According to a further aspect there is provided a second access point comprising circuitry configured to
  listen to response data units transmitted by one or more first stations associated with a first access point and configured to communicate with the first access point over a respective channel, the response data units being transmitted by the one or more first stations in a downlink sounding procedure performed by the first access point with the one or more first stations;
  estimate the respective channels using received response data units;
  listen to a training data unit transmitted by the first access point, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
  determine, based on the signaling information contained in a received training data unit, a resource unit allocation and beamforming configuration for use in subsequent communication with one or more second stations associated with the second access point.

According to a further aspect there is provided a second station comprising circuitry configured to
  listen to a training data unit transmitted by a first access point to which one or more first stations are associated for communicating with the first access point over a respective channel, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
  estimate channel and/or interference information based on a received training data unit;
  transmit the estimated channel and/or interference information to a second access point with which the second station is associated to communicate over a channel.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed station, the disclosed methods, the disclosed computer program and the disclosed computer-readable recording medium have similar and/or identical further embodiments as the claimed access point and as defined in the dependent claims and/or disclosed herein.

One of the aspects of the disclosure is to enable beamforming based spatial reuse with minimum amount of cooperation between access points. This is particularly appropriate for scenarios in which an access point is unable or unwilling to perform interference nulling, but can assist other access points in obtaining the required information for beamforming based spatial reuse. The approach comprises introducing a new training data unit, based on which a cascaded sounding protocol may be devised. Further, appropriate control message flows and examples for the potential application to 802.11 multi AP scenarios are presented.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

The goal of the present disclosure is to enable opportunistic beamforming based spatial reuse in a WLAN scenario in which an AP within an oBSS (also called oAP or second AP herein) learns about required channel state information and shared resource allocations and further designs appropriate beamforming techniques to stations within its oBSS (also called oSTAs or second stations herein) without the coordination by a master device (e.g. master AP). The involvement of the AP, allowing other STAs access to its spectrum during downlink transmission, is minimal and comprises sharing information necessary for the oAPs to determine spatial reuse opportunities, however without taking decisions about the shared spectrum.

Figure 1:
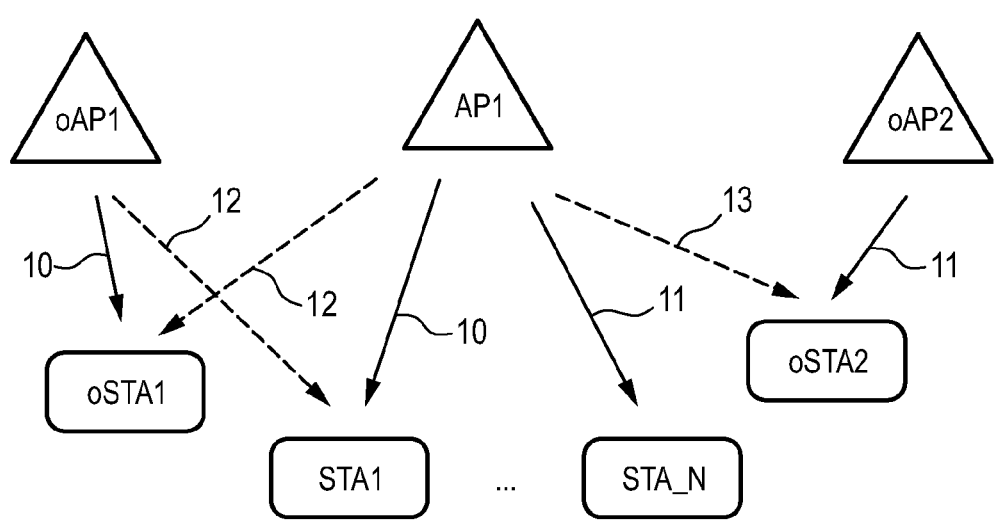
FIG. 1 shows a schematic diagram of an exemplary embodiment of a communication system according to the present disclosure.

FIG. 1 shows a schematic diagram of an exemplary embodiment of a communication system according to the present disclosure. One AP with multiple antennas performs OFDMA transmission towards stations (also called first stations herein) STA1 to STA_N, in which one or more of the resource units use downlink (DL) multi-user (MU) multiple-input multiple-output (MIMO) mode. The DL MU MIMO beamforming scheme employed by the AP1 does not consider any interference minimization towards STAs outside its BSS. On the other hand APs outside of the BSS could potentially make use of the spectrum already utilized by AP1 by making appropriate use of beamforming techniques. In FIG. 1 arrows 10 indicate useful DL signals using a first resource unit RU1, arrows 11 indicate useful DL signals using a second resource unit RU2, arrows 12 indicate interference using a first resource unit RU1, and arrow 13 indicates interference using a second resource unit RU2.

Hereby, it is assumed that the AP1 is selfish, i.e. there is no interference nulling towards oSTAs, but it applies beamforming only with respect to its own STAs STA1 to STA_N and performs a sounding procedure only with its own STAs. Further, it is assumed that the oAPi knows channels to STA1 and has interference nulling capability and that the oSTAs are reporting to their corresponding oAPs, with which they are associated.

It shall be noted that the present disclosure will mainly be explained in the following with the reference to the general case of MU OFDMA. However, the particular cases of non-OFDMA or single user (SU) transmission can be approached similarly. This can e.g. be done by assuming one RU occupying the whole bandwidth of the channel in use by the transmission.

The stations and access points used according to the present disclosure may be implemented using appropriate hardware and/or software. For instance, said devices may comprise circuitry that is configured to carry out the respective operations. Circuitry may be understood as a programmed processor or computer or as dedicated hardware elements that are made for performing certain operations, such as respective units or sections. For instance, the disclosed devices may be implemented using a processing unit (e.g. for carrying out signal processing), a communication unit (e.g. for transmitting and/or receiving signals) and a control unit (e.g. for controlling the processing unit and/or the communication unit and/or for controlling the whole operation).

There are currently two main approaches to allow spatial reuse. One approach considers a transmit power control based scheme in which the different APs are advertising if spatial reuse is acceptable and with which parameters. Based on these schemes oAPs can reuse the spatial resources if they can adapt the transmission parameters to respect interference conditions indicated by the AP. Coordination from the AP side is not necessary in this case. However, the schemes defined in this context only consider power control and not beamforming aided spatial reuse.

A different approach which allows the more advanced beamforming based spatial reuse is to define a cooperative scheme in which the AP which is sharing its resources is also coordinating the activity of the oAPs which are using its resources. In order to null interference towards STAs outside the BSS, an AP however loses degrees of freedom which it would otherwise use for serving its own traffic. Furthermore, participating in a cooperative beamforming sounding creates overhead to the AP and associated STAs. A large part of the overhead is due to the fact that the oSTAs which are nulled have to be known at the AP beforehand and channel state information should be gathered for these. This overhead may not be justified, e.g., when an AP is not capable or not willing to perform beamforming based spatial reuse. However, the fact that an AP is not actively nulling interference towards known oSTAs does not mean spatial resources are not reusable by other BSS capable of performing more aggressive interference nulling beamforming.

The present disclosure focuses on developing an approach, which, contrary to the existing methods, does not consider coordination from a master AP. One idea of the present disclosure is as follows. Since per scenario assumption, the AP1 does not participate in the coordinated beamforming scheme, it also has little incentive to spend time resources on a coordinated training. Thus, it is performing the sounding for STAs belonging to its own BSS, without sharing resources for STAs within the other oBSSs. However, it allows oAPs to gather channel state information (CSI), RU allocation, beamforming information, and/or indication of whether spatial reuse is possible and under which conditions. For this purpose AP1 constructs a physical protocol data unit (PPDU), which it sends after performing sounding with STAs associated to itself, in such a way to enable oSTAs to measure the interference experienced with the newly computed beamforming vectors or a function of these. This PPDU, which is sent to enable oSTAs and oAPs to train i.e., obtain channel estimates and information regarding spatial reuse opportunities from the AP1, is further on referred to as training data unit. Based on specific control information extracted from packets sent by the AP1, as well as from estimation of the channels from STAs during the sounding, oAPs determine if there exist resources which can be shared in spatial or spectral domain. If this is the case, oAPs request a series of measurement results from oSTAs and design beamforming vectors towards specific oSTAs which respect interference constraints towards STA1 to STA_N. oSTAs and oAPs should be able to continue decoding the training data unit, even if it was sent by an AP to which these are not associated. To enable this, the addressing of the training data unit can be either a broadcast address or an identifier of oSTAs or oBSSs, based on some previous exchange of information between AP and corresponding oAPs.

Figure 2:
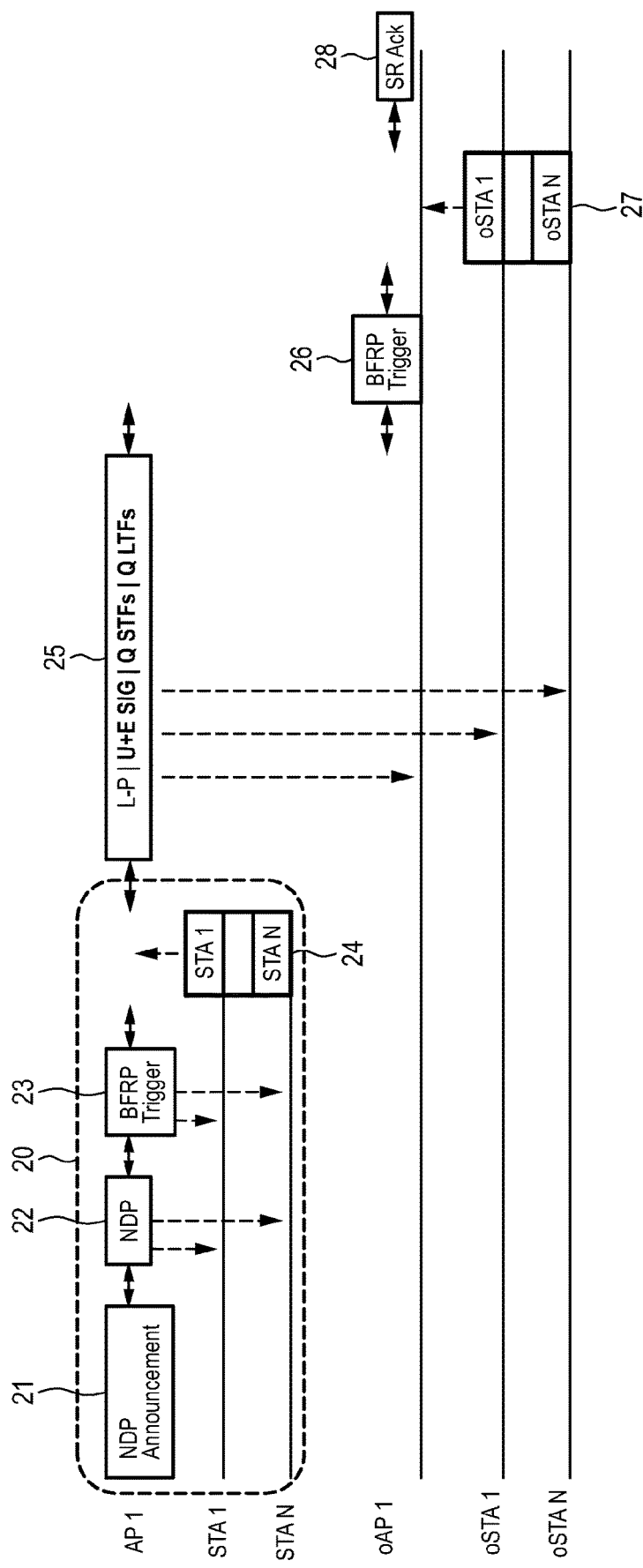
FIG. 2 shows a schematic diagram illustrating an embodiment of a method according to the present disclosure using explicit sounding.

FIG. 2 shows a schematic diagram illustrating an embodiment of a method according to the present disclosure using explicit sounding. This embodiment particularly illustrates the training flow under the assumption of explicit sounding at the AP1.

The first part 20 of the sounding procedure from AP1 to STA1 to STA_N, which are associated with AP1, is in this embodiment a regular DL sounding procedure. The downlink sounding procedure 20 is performed to enable AP1 to determine resource unit allocation and beamforming configuration for use in subsequent communication with respective stations among STA1 to STA_N.

In this embodiment the downlink sounding procedure 20 comprises a null data packet (NDP) announcement 21, containing information about the required training, i.e., STAs participating, resource unit (RU) and bandwidth (BWV) information, and type of feedback requested. This is followed by one or more (in particular a series of) NDP packets 22, preferably comprising only PHY layer preambles (synchronization, estimation and control fields) but no data fields, as the intention of the one or more NDP packets is to allow the STAs to estimate the channel from AP1 for all streams to be transmitted. Subsequently, the AP1 requests for feedback information (i.e., a response) from STA1 to STA_N, e.g. by sending a beamforming report (BFRP) trigger frame 23, which contains the STAs which should respond and on which RUs. The requested STAs then respond by transmitting a response 24 (i.e., feedback), e.g. by each transmitting a trigger based (TB) response PPDU.

From AP1 and STA1 to STA_N perspective the procedure so far is following the same steps as the regular DL sounding phase. However, based on this frame exchange (in particular the transmission of the response 24, the oAP1 is able to estimate the channel within RUs allocated for the response. To allow a more accurate estimation at oAPs, one proposal is to enhance the definition of the response 24, in particular the TB PPDU as follows. The estimation sequences (e.g. estimation short training field (E-STF) and estimation long training fields (E-LTFs)) are sent over all subcarriers of the channel containing the STA-specific RUs, in orthogonal manner whereas the data part is only sent over the STA-specific RUs.

After the sounding procedure 20, AP1 sends a training data unit 25 to allow oSTAs to estimate the channels or measure the interference on the channels as these would experience them after AP1 applies the newly computed beamforming vectors. The training data unit 25 contains signaling information on the determined resource unit allocation and on the beamforming configuration. In a preferred embodiment the training data unit 25 may be an NDP like packet, e.g. a PPDU, with no data field. It may comprise several fields, including an L-P field, signaling fields and training fields.

L-P denotes a legacy preamble containing legacy synchronization followed by legacy estimation sequences.

U+E refers to the signaling fields, bearing control information to characterize and decode the packet, and comprising a universal SIG field (U-SIG) indicating standard version independent information and a version dependent signaling field (E-SIG) which depends on the current standard version being employed in the communication, e.g. extremely high throughput (EHT) communication. The use of EHT Signaling fields is exemplary. The training data unit may be embedded in (very high throughput) VHT type PPDUs also, in which case only version dependent signaling field is present. Within the SIG fields, necessary information to correctly decode the packet may be included. In an embodiment, SIG fields may contain information on RU allocation and space time stream and beam mapping, which may be used by oAP1 to determine which STAs will be allocated in which RU and whether the available channel estimation corresponding to the specific STAs and on the specific RUs to be used is accurate.

The transmit beamforming parameters used, i.e., Identifiers of the STAs for which the beamforming parameters apply, Beamforming Configuration and optionally the RU Allocation, may be mapped to a session index, which may be further included in the SIG fields in another embodiment. The session index indicates the beamforming configuration that is used by the AP1. Based on this information oSTAs may determine if they need to take an action, e.g. perform update or report measurements. Based on the session index oAPs may request measurement reports to determine if they have accurate channel information. Based on the session index and together with the corresponding set of channel measurements, oAPs may decide if spatial reuse may be possible/allowed for the particular session and advertise the spatial reuse opportunity to the oSTAs which can participate in it.

E-STF and E-LTF are the synchronization and estimation sequences, respectively, which may be sent e.g., with VHT or EHT modulated format, as indicated in FIG. 2, on specific resources indicated within the SIG fields. These fields are sent with the beamforming weighting matrices that have been determined after the sounding phase and that will be used during the next data transmission between AP1 and STA1 to STA_N. These beamforming weighting matrices are denoted with Q, Since the operation of applying the beamforming matrices corresponds to a mathematical multiplication per frequency bin, the beamformed sequences are depicted as Q STF and Q LTF in FIG. 2. The Q matrix may be the beamforming weighting matrix that will be used during the next transmission stage of AP1 for the trained MU MIMO configuration or it may be a function of this. More precisely, in the transmission a matrix Q is defined based on RUs to be used. However, a Q matrix, which is defined coarser, e.g. on channel bandwidth rather than RU granularity, or which considers some robustness margins for interference protection, may be used as well. Modulating the STF and LTF fields with the recently computed beamforming weighting matrices allows the oSTAs to estimate the beamformed channels or interference levels.

For transmitting the training data unit 25 the information on the beamforming configuration determined in the prior sounding procedure 20 is preferably used. For instance, the transmission of the training data unit 25 may be done such that a set of estimation sequences included in the signaling information is modulated by beamforming weights computed after the sounding based on the sounding information obtained in the sounding procedure 20.

The transmission of the training data unit 25 may be announced by the NDP announcement 21. This allows oAPs to understand that they should be ready to also estimate the channels of STA1 to STA_N and determine the possibility of a SR transmission. Furthermore, it allows keeping the channel busy for the sounding duration, including the transmission of the training data unit. In one embodiment, the training data unit is sent after a short interframe space (SIFS) time after the feedback TB PPDU. However, it can also be sent within a separate transmit opportunity.

After estimating the channels of the STAs based on the response 24 (e.g. the TB PPDU) and checking that the RUs for which the estimates have been determined are the same or close to the ones which will be used during the subsequent MU MIMO transmission from AP1 based on the training data unit 25, oAP1 gathers measurement reports from a particular set of oSTAs. In order to do this, it may send a trigger frame 26, in response to which the oSTAs transmit a response, e.g. by each transmitting a TB PPDU 27, which contains the report on requested RUs and interference levels. Finally, the oAP1 send an SR acknowledgement (Ack) 28 that allows oSTAs to participate in next shared transmit opportunity (TXOP) and that may indicate RU allocation and session index. The RU allocation holds only for a given session index. Once a different session index is advertised by AP1, the previously described operations may be reiterated. The session index is preferably used in subsequent data transmissions from AP1 to the STAs corresponding to the same group and having the same beamforming configuration as the one currently used.

Figure 3:
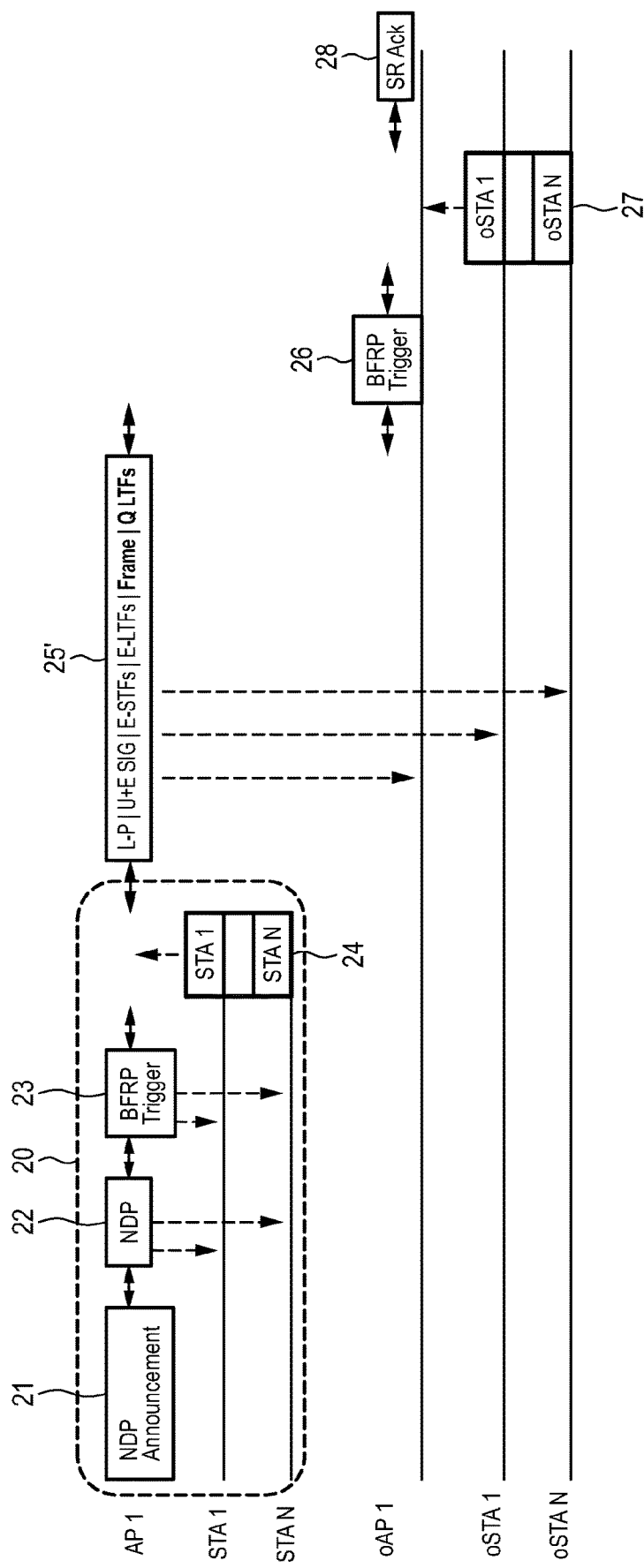
FIG. 3 shows a schematic diagram illustrating another embodiment of a method according to the present disclosure using explicit sounding.

In case multiple MIMO configurations for one or multiple sets of STAs are determined as part of the training, the proposed training data unit 25' may be designed to contain information about these configurations. This is illustrated in FIG. 3 showing a schematic diagram illustrating another embodiment of a method according to the present disclosure using explicit sounding. In this embodiment of the training data unit 25', after the legacy and SIG fields, synchronization and estimation sequences, e.g., EHT modulated STF and LTFs, are sent followed by a frame containing the sets of possible configurations. After this, e.g. within a packet extension, one or more beamforming configurations may be modulating appended LTF fields, allowing the oSTAs to measure the channels and/or interference levels from the AP1 towards themselves. Packet extension refers to the fact that after the data part of the regular PPDU some additional padding or, in this case, estimation sequences are attached. The existence of these fields must be indicated in the preamble of the packet. The Q matrices that are applied in this case are defined per RU and correspond at least to the first configuration to be used for the data transmission.

In the embodiments illustrated in FIGS. 2 and 3, the training data unit 25 is a PPDU that is sent with beamforming weights computed during the same sounding interval, i.e. during the DL sounding procedure 20. According to the embodiment illustrated in FIG. 2 the training data unit (or training PPDU) does not carry a medium access control (MAC) frame but only consists of the PHY preamble. According to the embodiment illustrated in FIG. 3, the training data unit is a PPDU, which carries MAC data, however, the content of the data is control information regarding the RU allocation, STA identifiers, and beamforming configurations. There are cases in which including the control information in the training data unit may be useful. One is when the training PPDU is sent as single user PPDU format, in which case it is not possible to include control information for all STAs. A second is when multiple MIMO configurations have been computed during the sounding and these cannot be signaled in the preamble of the packet. In the latter cases, the training data unit is a PPDU which contains a PHY preamble, the frame containing control information and additional estimation sequences, corresponding to the beamforming configurations indicated within the frame.

Figure 4:
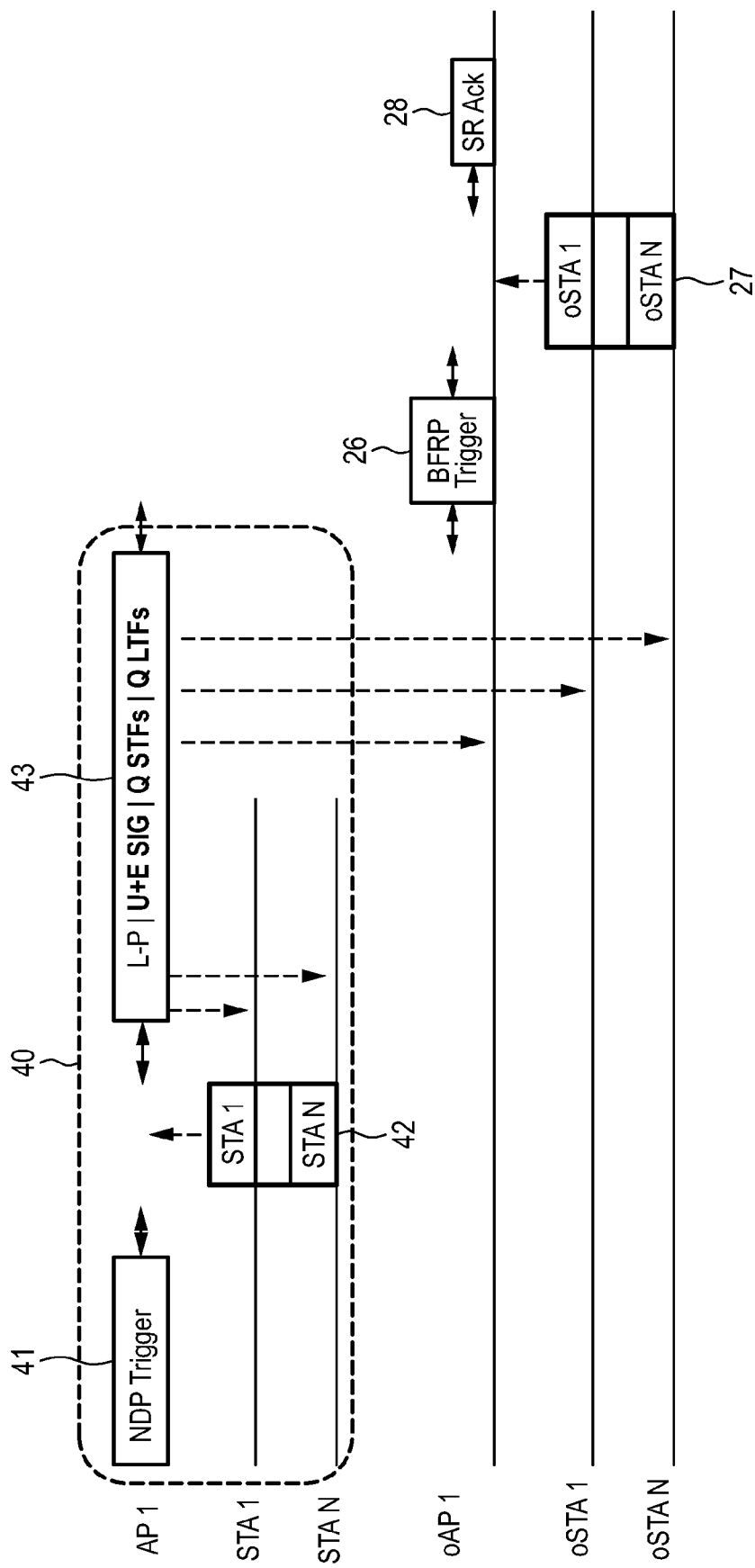
FIG. 4 shows a schematic diagram illustrating an embodiment of a method according to the present disclosure using implicit sounding.

The ideas described above with respect to FIGS. 2 and 3 can be also applied in the case of implicit sounding between the AP and STA1 to STA_N. A schematic diagram illustrating an embodiment of a method according to the present disclosure using implicit sounding is shown in FIG. 4. The advantage of the implicit training is that in this case the oAPs can determine the channels from STA1 to STA_N over the full bandwidth or over the full range of the RUs, from which the AP1 will decide on the final RU and beamforming allocation. As a comparison, in the embodiment illustrated in FIGS. 2 and 3, the oAP can correctly estimate only channels over the specific RU allocation over which the STAs reply to the feedback request.

In the embodiment illustrated in FIG. 4, the training (i.e. the downlink sounding procedure 40) starts with a request 41 for a response from STA1 to STA N, in particular by sending trigger frame. The trigger frame indicates parameters based on which second STAs should send the subsequent response 42. Among these parameters are one or more of: channel and bandwidth information, number of orthogonal synchronization and estimation sequences to be used by each STA, identifier of which synchronization and estimation sequences are to be used by each STA and transmit power requirements to be respected by the STAs in the transmission of the response 42. The latter are used to ensure that differentiating between the effects of the channel and of the transmission can be correctly made. In response to the request, in particular within short interframe spaces (SIFS) of the trigger frame, a response 42 is sent by all the STAs addressed in the trigger frame and with the parameters requested by AP1, in particular by sending response data units. Different to the response 24, the response 42 may consist entirely of PHY preamble, including legacy synchronization, estimation and signaling and standard specific signaling, synchronization and estimation sequences, whereby the latter synchronization and estimation sequences are the ones sent in orthogonal fashion. Since, with the scheme shown in FIG. 4, it is the AP1 estimating the channels from the STA1 to N directly from the estimation sequences, inclusion of data frames within the TB PPDU 42 is not necessary for the estimation (may be included for purposes outside of the applications mentioned herein). In contrast, in the scheme in FIGS. 2 and 3, STA1 to STA_N estimate the channels and feedback the result of the estimation to the AP. Thus, the response 24 contains channel feedback information within the data fields. Subsequently, the training data unit 43 is sent, which is similar or identical to the content of the training data unit 25 described above with reference to FIG. 2, which is followed by the same steps as illustrated above in FIGS. 2 and 3 with reference to items 26 to 28.

Figure 5:
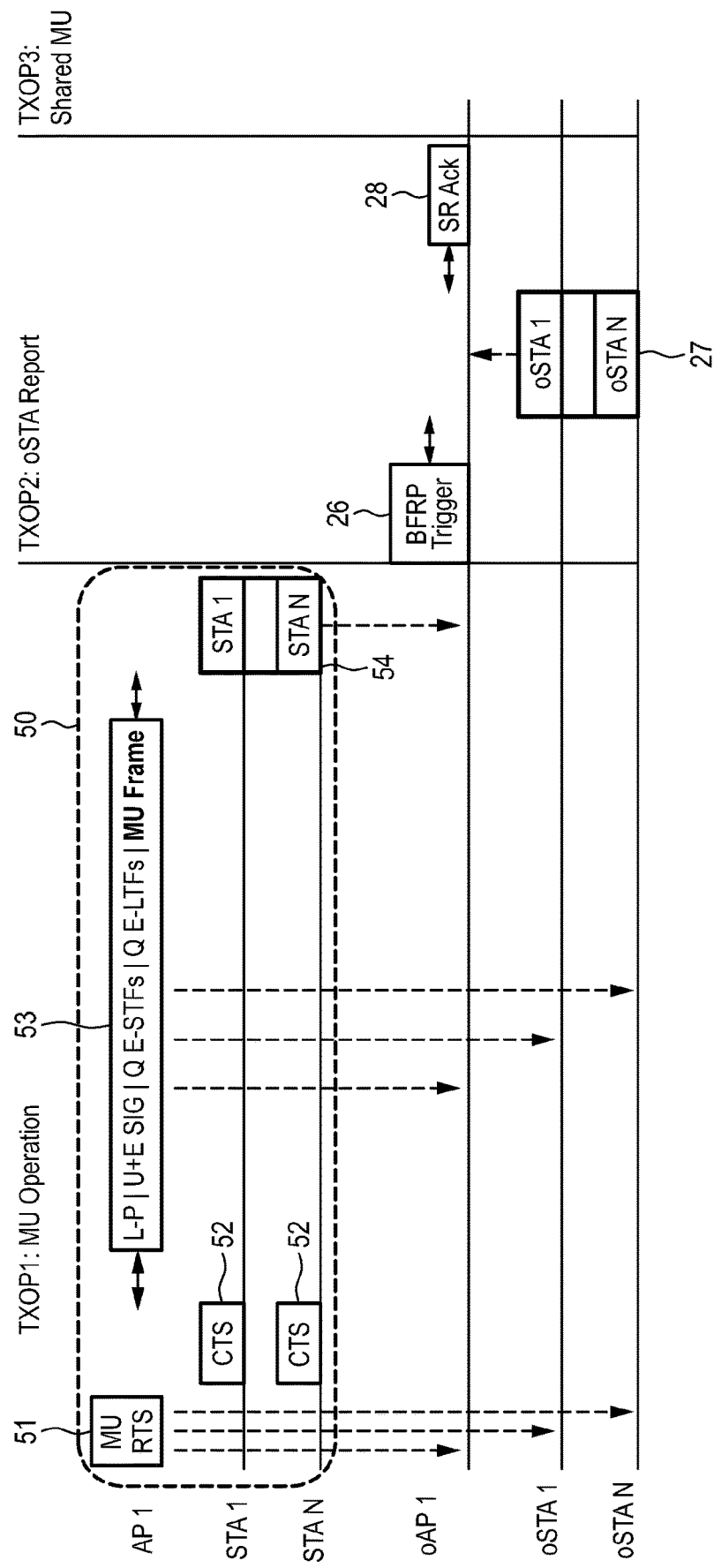
FIG. 5 shows a schematic diagram illustrating an embodiment of a method according to the present disclosure that transmits a training data unit during a regular data transmission.

The embodiments described above with reference to FIGS. 2 to 4 imply that AP1 needs to send a specific PPDU (the training data unit) after the sounding procedure, which is however of low or no value for the stations within its BSS, i.e. the stations associated with AP1. FIG. 5 shows a schematic diagram illustrating another embodiment of a method according to the present disclosure that avoids this overhead and does not transmit the training data unit after the sounding procedure but during a regular data transmission.

Figure 6:
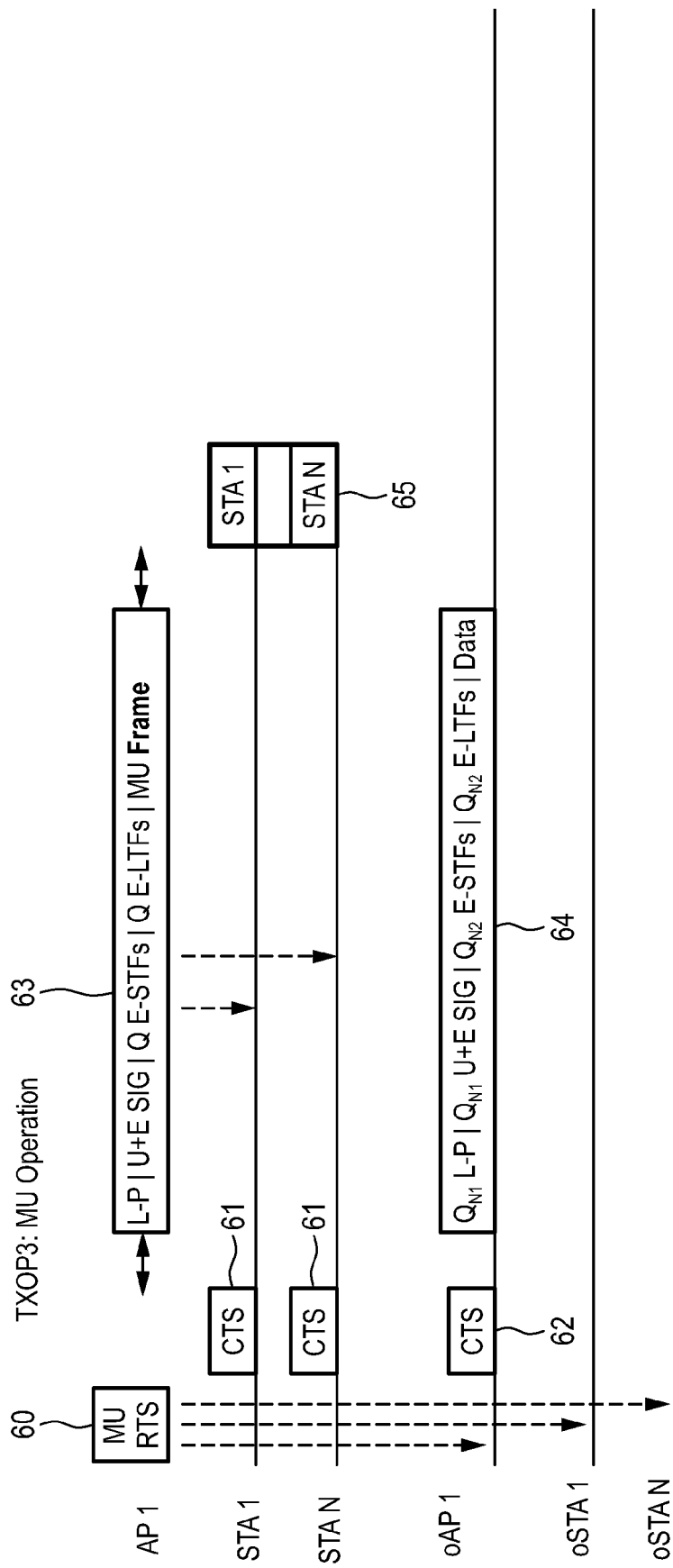
FIG. 6 shows a schematic diagram illustrating an embodiment of a method of spatial reuse with the second access point performing opportunistic beamforming according to the present disclosure.

In this embodiment, oAPs obtain the channel information from multi-user (MU) PPDUs (training data units 53) sent by the AP1 during the regular data transmission 50. FIG. 5 particularly illustrates the procedure required for gathering CSI and measurement reports, whereas the operation with beamforming weighting matrices obtained with the newly gathered CSI is illustrated in FIG. 6.

As shown in FIG. 5, after the sounding phase (not depicted in FIG. 5) and during a transmission phase 50 (also called transmit opportunity TXOP1), AP1 attempts an MU DL transmission by sending an MU ready-to-send (RTS) trigger frame 51 to the STAs which are part of the MU group to be served. Each responds with a clear-to-send (CTS) frame 52 within the same predefined time interval after reception of the MU-RTS frame 51. For STA1 to STA_N this is the regular MU DL operation. However, based on the Q E-STF and Q E-LTFs within the MU PPDU 53, the oSTAs can estimate the interference and/or channels per RU allocation and MU session configuration. The stations STA1 to STA_N respond with a response 54. The preamble part of 54 is identical or similar to the response 24 or 42; these packets only differ in functionality (the former carries acknowledgement information to data units sent from the AP, whereas the latter contain channel feedback information). For the purpose described herein, however the data content of 54, 24 and 42 is not important, as only the preamble information is generally used by the oSTAs and oAPs.

Under current standard operation, the MU PPDU is currently intended for the specific STAs indicated in the preamble by allocation identifiers, while oSTAs, which are not intended recipients, would normally discard the packet. Thus, to enable the operation described above, it is proposed to redefine the MU RTS trigger 51 to indicate to the oSTAs the start of an SR eligible MU MIMO transmission. Based on the indication in the MU RTS frame 51 and indication from oAPs, the oSTAs measure the CSI, as required by their corresponding oAP. After the transmit opportunity TXOP1 showing the MU operation, oAPs contend for the channel. The one who wins, sends a trigger frame 26 to the corresponding oSTAs, associated to itself, on the RUs for which measurement reports are requested.

Thus, according to the embodiment shown in FIG. 5, based on the MU RTS trigger frame 51, oSTAs start measuring channels on the preamble of a subsequent MU frame. An indication of a session index (indicating one or more of the beamforming configuration, a function of the beamforming configuration, identifiers of intended first stations and/or the resource unit allocation used by AP1; in an embodiment indicating the group ID and the beamforming configuration) is useful to indicate to the oSTAs whether they have been requested for measurements on the specific session and configuration.

With the trigger based PPDU (the training data unit 53), the oAP is estimating or updating channels on the respective RUs. If previous channel estimates on the RUs were available, based on a previous training phase, the determined channels are averaged with the available information. Transmit power (TxPower) of each STA should be indicated, in order to allow differentiating between channel effect and transmit effect. This can be easily included in the preamble of the training data unit 53. The transmit opportunity TxOP2 following transmit opportunity TxOP1 comprises steps 26 to 28 shown in FIGS. 2 to 4.

The opportunistic beamforming operation (indicated as transmit opportunity TxOP3), based on the newly computed nulling beamforming weighting matrices, is schematically shown in FIG. 6. The MU operation between AP1 and STA1 to STA_N follows the usual procedure, i.e., starts with an RTS trigger frame 60 from AP1, requesting the addressed STAs to respond with a trigger based CTS 61. The oAP, which has gained the channel access within transmit opportunity TxOP2 (shown in FIG. 5) to gather measurement reports and compute beamforming matrices with nulling constraints, is also responding to the RTS frame. From oAP1 this is a CTS to self 62, meant to inform STAs and oSTAs of the medium reservation. The operation described in FIG. 6 is the same regardless of how the training was performed i.e., whether it was with the explicit training depicted in FIGS. 2 and 3, implicit training as depicted in FIG. 4, or the training embedded in the MU transmission opportunity of AP1 as depicted in FIG. 5.

The BF based SR PPDU, i.e., the response 64 to a physical protocol data unit 63 (PPDU) for regular data transmission, is sent such that the preamble part is beamformed with beamforming matrices, such that the transmission of the PPDU 63 does not create interference towards STA1 to STA_N. The beamforming weighting matrix QN1 can be the same matrix that will be used during the regular transmission or a coarser version of matrix. Hereby, coarser refers to the fact that it is designed to cover the whole channels from which the actual RUs of the transmission between oAP and oSTA are chosen, optionally with some smoothing in frequency. Finally, the stations STA1 to STA_N transmit acknowledgement 65 to the AP1, indicating correct reception of the MAC data units from AP1 or necessity to retransmit. Acknowledgements from oSTAs to the oAP would be sent in a different time unit interval as the ACKs for the STAs (not shown in FIG. 6).

The beamforming session index may be included in the RTS trigger. This allows the second access points to determine if they have up to date communication parameters for the specific beamforming scenario, i.e., they can serve oSTAs without creating interference.

Figure 7:
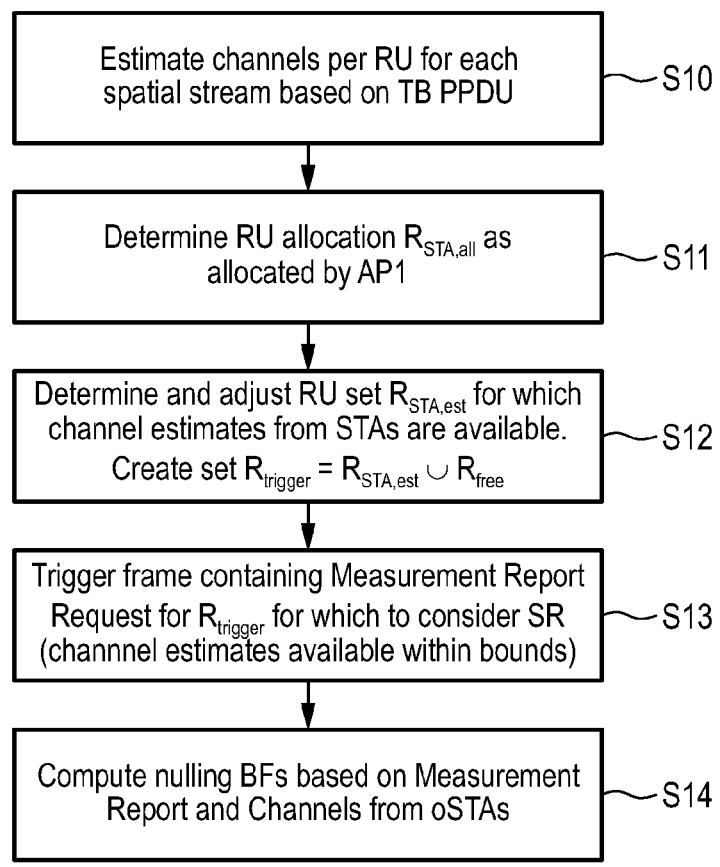
FIG. 7 shows a flowchart of an embodiment of the operation of a second access point.

FIG. 7 shows a flowchart of an embodiment of the operation of a second access point oAP1. In a first step S10 oAP1 performs a channel estimation of the channels from the STAs. The estimation is performed based on the UL transmission of the STAs and more specifically based on response frames 24, 42 (see FIGS. 2-4). In a second step S11 oAP1 determines the RU allocation for the STAs based on the SIG fields of the training data unit sent after the training phase. Subsequently in step S12, oAP1 determines a set of RUs which it can potentially use from: i) a set of allocated RUs for which channel estimates have been obtained, ii) a set of allocated RUs for which channel estimates have been inferred, and iii) a set of free RUs. For RUs from set i) beamforming with interference constraints is preferably used, for RUs from set ii) robust nulling towards the STAs is preferably employed, whereas for RUs from set iii) these can be used without necessarily making use of beamforming. Robust nulling refers to a beamforming design for which the interference nulling conditions hold even when errors within a certain bound exist. In a fourth step S13 a trigger frame containing a measurement report request is transmitted. In a fifth step S14 the nulling beamforming weights, i.e., beamforming weights such that interference constraints at the STAs are respected, are computed based on the measurement reports and channel estimates received from the associated stations.

Thus, oAP1 can determine if spatial reuse is possible and compute beamforming weight vectors such that no interference is created and then transmit data to the second stations during a transmission opportunity of the first access point, for which the second access point has determined that spatial reuse is possible. oAP1 thus can create nulling. The session index indicates the beamforming configuration that has been determined by AP1 and is used within the data transmission. oAP1 uses the session index to request the measurement reports from the oSTAs for that particular beamforming configuration, indicated in the session index. oAP1 further uses the session index sent within PPDUs during data transmission to determine if beamforming configuration is one for which it has determined nulling beamforming weights. Based on the session index, oAP1 can determine if it can spatially reuse the data transmission opportunity of AP1, characterized by the beamforming configuration indicated.

Figure 8:
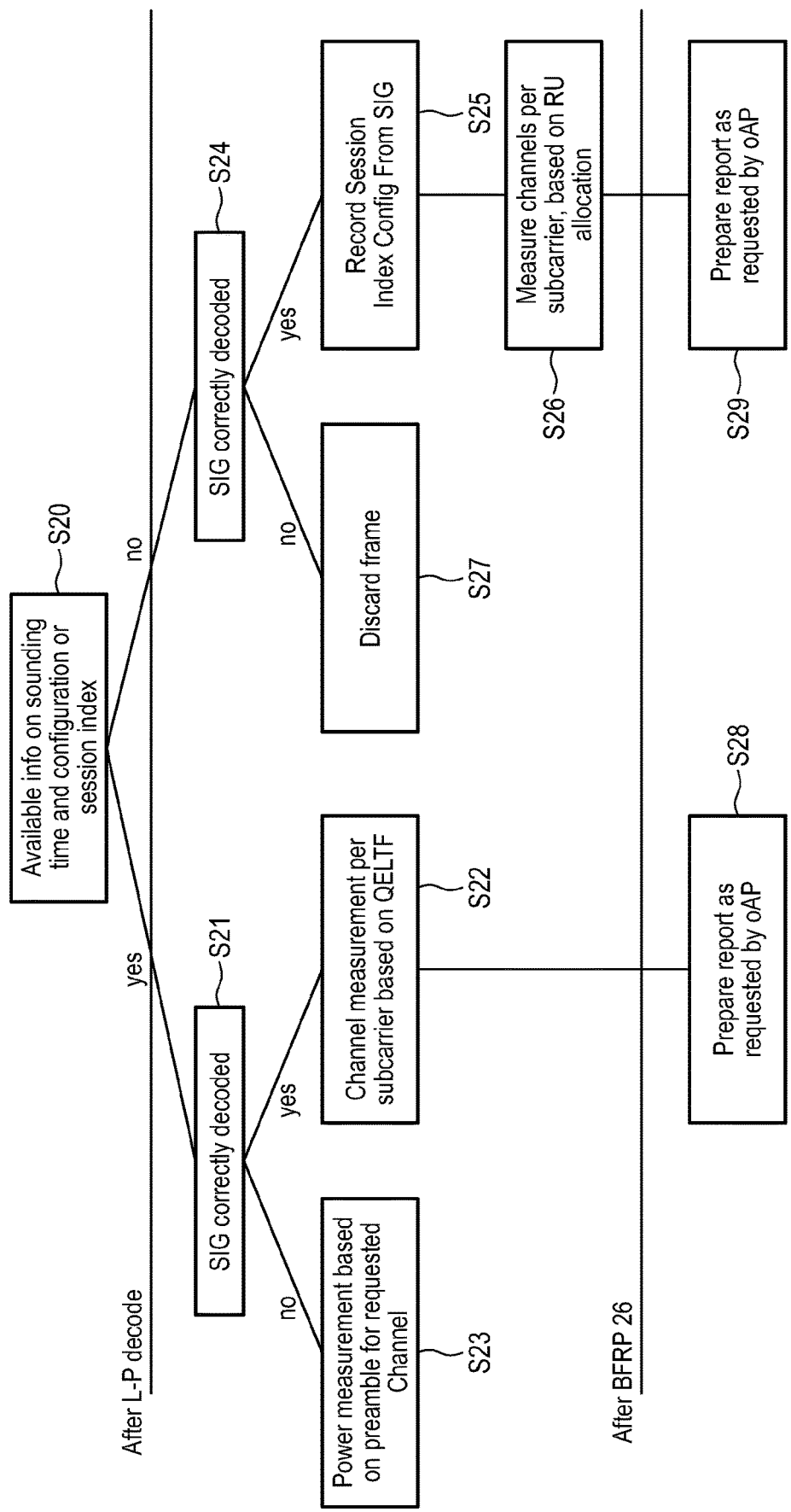
FIG. 8 shows a schematic diagram of the state flow of a second station.

FIG. 8 shows a schematic diagram of the state flow of a second station oSTA. If an oSTA has received an indication from the oAP in a previous message exchange containing e.g. a schedule of expected sounding times and information on the channels that it should measure interference or a session index (step S20), it will wait for reception of the training data unit during the indicated intervals with a certain time tolerance. It waits for receiving the legacy preamble, and if correctly received, proceeds to decode the U+E SIG (step S21).

If it can correctly decode the SIG information, it proceeds with determining the session index and format and number of LTFs and further with the channel estimation per frequency/subcarrier (step S22). If a training data unit was expected, the legacy preamble is decoded, but U+E SIG is not decoded. Then, only a power measurement on the preamble is performed (step S23).

If no schedule of the training is received or defined, after the preamble of the training data unit is detected, oSTA decodes the U+E SIG fields (step S24) only relies on information in the U+E SIG fields to determine if the received packet is a training data unit and to determine the session index (step S25). The oAP further proceeds to measure the channels on the beamformed LTF sequences (step S26). If the U+E SIG is not decoded, the training data unit is discarded (step S27).

The measurement report prepared in step S28 or S29 and sent in response to the trigger frame 26 from the oAP to the oSTAs should contain, for the indicated RUs, a succession of channel norm and channel phases, preferably in compressed form, or measured signal power. If no measurement was performed in an RU a default value would be indicated.

The request for the measurement reports, which is sent by the oAP in the trigger frame 26, should contain information about the RUs identified by the oAP as potentially sharable (i.e., RUs for which the oAP can control the interference towards the STAs below required limits) and the type of measurement, e.g., signal strength or channel norm and phase feedback for specific RUs. The request may be preceded by information sent by the oAP including time stamp of next sounding round of interest, together with the corresponding session index. This information can be obtained by the oAP from control information broadcasted by the AP1 and would be embedded in frames sent to the oSTAs in a stage that occurs prior to the flows presented in this disclosure.

Figure 9:
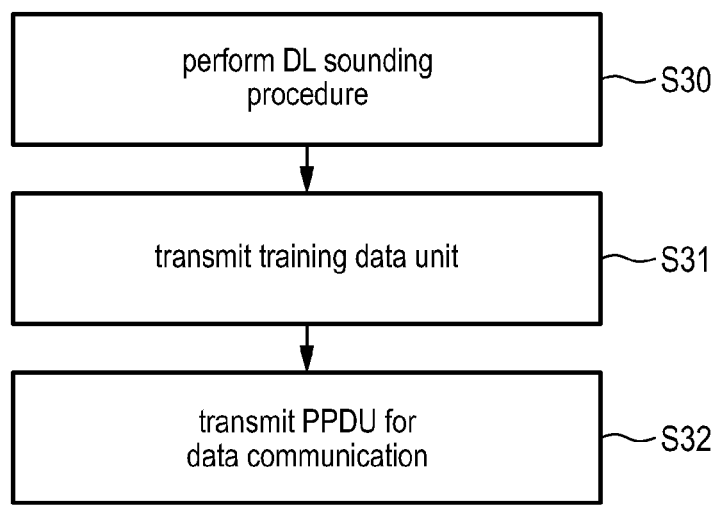
FIG. 9 shows a flowchart of an embodiment of the operation of a first access point.

FIG. 9 shows a flowchart of an embodiment of the operation of a first access point AP1. In a first step S30 AP1 performs a sounding procedure with one or more first stations to determine resource unit allocation and beamforming configuration for use in subsequent communication with respective first stations. In a second step S31 a training data unit containing signaling information on the determined resource unit allocation and on the determined beamforming configuration is transmitted, wherein the training data unit is transmitted with a beamforming configuration derived from the determined resource unit allocation and the determined beamforming configuration. The training data unit may thus be transmitted with the determined beamforming configuration or a beamforming configuration that is determined based on the determined beamforming configuration (and/or the determined resource unit allocation). More precisely, the latter refers to extending the beamforming weights to frequency subcarriers corresponding to a whole channel or frequency block to which the particular RUs belong or smoothing in frequency or applying beamforming weights corresponding to the determined configuration however adapted for statistical channel knowledge. The advantage of the latter is slower variation in time, while proving an acceptable indication of the level of interference that oSTAs would experience from the AP1. In a third step S32 a physical protocol data unit is transmitted to said one or more first stations, said physical protocol data unit comprising a session index, training sequences and data to be transmitted to the respective first station.

Figure 10:
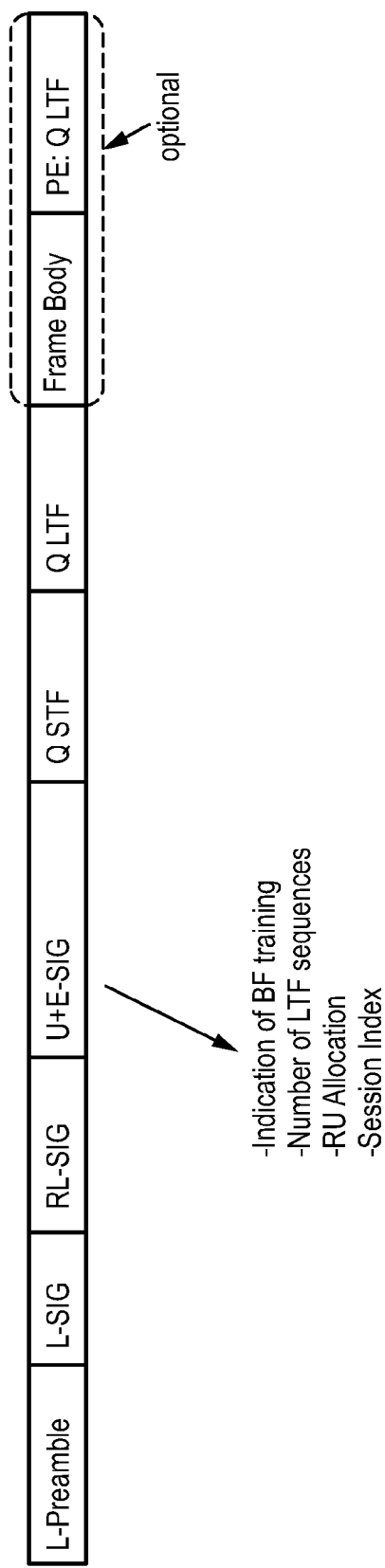
FIG. 10 shows a diagram of example of the training data unit for nulling training.

FIG. 10 shows a diagram of example of the training data unit for nulling training. The required control signaling that should be included in the U+E SIG fields are: bandwidth and channels, resource allocation, session index (identifying the MU and BF configuration such that measurements can be averaged or updated whenever the configuration is used) and the number of LTFs and format.

It should be noted that the session index applies to all sounding procedures disclosed herein and is a combination of RU allocation user ID and possibly information on updated beamforming. Any other oSTA or oAP may perform any actions based on this.

The signaling of the session index in challenging because when an AP has been operating for a long time and changed RU allocation and beamforming configuration often, it may run out of session indices as these session number originate from a limited set. Thus, an implementation of a forgetting mechanism may be applied, as described in the following.

Assuming that the set of session indices contains N indices from 0 to N−1, a standard or AP1 may define a window length W<N−1 denoting the window of consecutive indices that are considered to be current, i.e. in use. Any oAP observes the session indices that are sent in PPDUs by AP1. It maintains a set S holding W consecutive session indices. Once the oAP observes a session index T that is not part of the current set, it establishes a new set which is given by $$S=[\mod(T-W+1,N) \ldots T]$$

In this equation T may be lower as mod(T−W+1,N), in which case the window is spanned from mod(T−W+1,N) via N−1 to T. This can be also expressed by a case-by-case definition as follows:

$$S = \begin{cases} [T-W+1 \ldots T] & \text{if } W-1 \le T \le N-1 \\ [0 \ldots T, N-W+T+1 \ldots N-1] & \text{if } 0 \le T < W-1 \end{cases}$$

At the beginning the set S is undefined, i.e. the oAP awaits the first session index by AP1 and establishes its set according to the equation above. For each element of the set the oAP shall note which STAs can be served and have been trained according to the procedure described before. Any session index that falls out of the current set S is considered not to be trained and requires training or retraining according to the procedure described above before oSTAs are served by oAP at same time as AP1 is transmitting.

Two examples illustrate this embodiment:
N=8, W=4, T=5 results in S=[2 . . . 5]
N=8, W=4, T=2 results in S=[0 . . . 2, 7]

The present disclosure provides the following advantages: beamforming aided spatial reuse with minimal amount of cooperation between APs; avoiding the need for one master AP to coordinate the scheme and collect information about STAs from other BSSs that require nulling; the disclosed solution can be designed to be forward compatible, e.g., to allow EHT STAs with some version of coordinated BF to still participate in the spatial reuse scheme (due to the signaling and channel acquisition methods); natural mapping to the spatial reuse as well as sounding concepts.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, a semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriate circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. First access point comprising circuitry configured to
   perform a sounding procedure with one or more first stations associated with the first access point and configured to communicate with the first access point over a respective channel to determine resource unit allocation and beamforming configuration for use in subsequent communication with respective first stations; and
   transmit a training data unit containing signaling information related to the determined resource unit allocation and related to the determined beamforming configuration, wherein the training data unit is transmitted with a beamforming configuration derived from the determined resource unit allocation and the determined beamforming configuration.

2. First access point as defined in any one of the preceding embodiments,
wherein the signaling information contains an identifier, indicating that the destination of the training data unit are one or more second access points and/or second stations associated with a second access point and not associated with the first access point or a broadcast group.

3. First access point as defined in any one of the preceding embodiments,
wherein the signaling information includes information on one or more of resource unit allocation, beamforming configuration, number of channel estimation sequences, type of channel estimation sequences, indication of training packet and indication if spatial reuse is allowed during data transmission with beamforming or session index parameters as indicated in the signaling information.

4. First access point as defined in any one of the preceding embodiments,
wherein the training data unit contains a session index indicating one or more of a beamforming configuration, identifiers of intended first stations, the resource unit allocation used by the first access point, and one or more transmission parameters.

5. First access point as defined in any one of the preceding embodiments,
wherein the training data unit contains a MAC frame carrying information on one or more MIMO configurations and resource unit allocation for one or more sets of first stations associated with the first access point and configured to communicate with the first access point over a respective channel 6. First access point as defined in any one of the preceding embodiments,
wherein the circuitry is configured to perform the downlink sounding procedure by
transmitting a null data packet announcement;
transmitting one or more null data packets;
requesting feedback from one or more first stations on respective resource units; and
receiving feedback data units transmitted by the one or more first stations.

7. First access point as defined in embodiment 6, wherein the circuitry is configured to receive the feedback data units transmitted by the one or more first stations using the respective resource units for transmitting the requested feedback and using the channel bandwidth indicated in the null data packet announcement for transmitting estimation sequences.

8. First access point as defined in embodiment 6 or 7, wherein the circuitry is configured to indicate in the null data packet announcement one or more of the start of a sounding interval for a spatial reuse eligible transmission, the bandwidth information to be used in the following sounding, and the transmission of the training data unit.

9. First access point as defined in embodiment 6, 7 or 8, wherein the circuitry is configured to transmit the training data unit a time period after receiving the feedback data units or within the interval of the downlink sounding procedure or at the last segment of the interval of the downlink sounding procedure.

10. First access point as defined in any one of the preceding embodiments,
wherein the circuitry is configured to perform the downlink sounding procedure by
transmitting a trigger to request a response from one or more first stations, the trigger containing information on resource allocation for the respective first stations and one or more of the number of training sequences, the number of streams per resource unit, an identifier of which orthogonal sequences to be used by the respective first stations, transmit power requirements for the respective first stations, and information that spatial reuse is allowed or not on future transmissions; and
receiving response data units transmitted by the one or more first stations based on the parameters contained in the trigger.

11. First access point as defined in any one of the preceding embodiments,
wherein the circuitry is configured to transmit the training data unit containing signaling information as part of data communication with one or more first stations.

12. First access point as defined in any one of the preceding embodiments,
wherein the circuitry is configured to
transmit, after performing the downlink sounding procedure, a ready-to-send, RTS, trigger to one or more first stations, the RTS trigger indicating the start of a spatial reuse eligible MIMO transmission; and
receiving a clear-to-send, CTS, response from one or more first stations to which a RTS trigger has been sent.

13. First access point as defined in embodiment 12, wherein the RTS trigger contains a session index referring to said one or more first stations that are being served in a subsequent PPDU.

14. First access point as defined in embodiment 4, wherein the circuitry is configured to transmit, after performing the downlink sounding procedure, a physical protocol data unit to said one or more first stations, said physical protocol data unit comprising the session index, training sequences and data to be transmitted to the respective first station.

15. First access point as defined in any one of the preceding embodiments,
wherein the training data unit contains synchronization and/or estimation sequences.

16. First access point as defined in any one of the preceding embodiments,
wherein the circuitry is configured to transmit the training data unit containing signaling information as part of data communication with one or more first stations.

17. First access point as defined in any one of the preceding embodiments,
wherein the beamforming session index is included in the RTS trigger.

18. First access point as defined in any one of the preceding embodiments,
wherein the training data contains the information about the beamforming configuration within a universal signaling field or a standard version independent signaling field.

19. First access point as defined in any one of the preceding embodiments,
wherein the circuitry is configured to predict channels on neighboring resource units to the estimated resource units and to create beamforming vectors which null the interference within these resource units with stricter error margins than for estimated resource units.

20. Second access point comprising circuitry configured to
listen to response data units transmitted by one or more first stations associated with a first access point and configured to communicate with the first access point over a respective channel, the response data units being transmitted by the one or more first stations in a sounding procedure performed by the first access point with the one or more first stations;
estimate the respective channels using received response data units;
listen to a training data unit transmitted by the first access point, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
determine, based on the signaling information contained in a received training data unit, a resource unit allocation and beamforming configuration for use in subsequent communication with one or more second stations associated with the second access point.

21. Second access point as defined in embodiment 20, wherein the circuitry is configured to
determine if spatial reuse is possible and compute beamforming weight vectors such that no interference is created,
transmit data to the second stations during a transmission opportunity of the first access point, for which the second access point has determined that spatial reuse is possible.

22. Second access point as defined in any one of embodiments 20 to 21, wherein the circuitry is configured to estimate the respective channels using estimation and signaling information contained in the received response data units.

23. Second access point as defined in any one of embodiments 20 to 22, wherein the circuitry is further configured to
request feedback from one or more second stations on resource units and/or interference levels and/or request channel feedback information on one or more resource units; and
receive feedback data units transmitted by the one or more second stations, the received feedback data units containing the requested feedback.

24. Second access point as defined in embodiment 23, wherein the circuitry is configured to request feedback by transmitting a trigger including information about one or more of resource units potentially usable for subsequent communication, resource units for which feedback is requested and the format of the requested feedback.

25. Second access point as defined in any one of embodiments 20 to 24,
wherein the circuitry is configured to transmit an acknowledgement to the one or more second stations for use in subsequent communication with the second access point, the acknowledgement indicating one or more of the session index, the second stations which are allowed to use the spatial reuse resources, the resource allocation, the beamforming configuration, and the acknowledgement behavior.

26. Second access point as defined in any one of embodiments 20 to 25,
wherein the circuitry is configured to
listen to a ready-to-send, RTS, trigger transmitted by the first access point to one or more first stations, the RTS trigger indicating the start of a shared resource eligible MIMO transmission and preferably a session index indicating the beamforming configuration or a function of the beamforming configuration used by the first access point; and
estimate the channels from the one or more first stations during uplink transmission to the first access point or reply with a clear-to-send, CTS followed by data transmission to one or more second stations STAs.

27. Second access point as defined in any one of embodiments 20 to 26,
wherein the circuitry is configured to communicate with one or more second stations using respective beamforming configurations that do not create interference towards the one or more first stations, for which the resource unit allocation and beamforming configuration has been determined.

28. Second access point as defined in any one of embodiments 20 to 27,
wherein the circuitry is further configured to request measurement in a frame exchange that happens before the sounding procedure.

29. Second access point as defined in embodiment 28,
wherein the circuitry is further configured to request measurement in particular by sending a frame indicating to a set of second stations that they are requested to listen to specific sounding information, in particular sounding from a set of first access points and/or sounding within a certain time interval and/or sounding from first access points using known beamforming session indices, and to prepare reports.

30. Second station comprising circuitry configured to
listen to a training data unit transmitted by a first access point to which one or more first stations are associated for communicating with the first access point over a respective channel, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
estimate channel and/or interference information based on a received training data unit;
transmit the estimated channel and/or interference information to a second access point with which the second station is associated to communicate over a channel.

31. Second station as defined in embodiment 30,
wherein the circuitry is further configured to
monitor a channel for training data units transmitted with an indication that sounding is for a future spatial reuse eligible transmission; and
report estimated channel and interference information for session indices, requested by the second access point or for session indices for which interference is below a predefined threshold, a session index indicating beamforming configuration or a function of the beamforming configuration used by the first access point.

32. Second station as defined in any one of embodiments 30 to 31,
wherein the circuitry is further configured to determine, based on the signaling information contained in a received training data unit, beamforming related information used for estimating the channel or interference information.

33. Second station as defined in any one of embodiments 30 to 32,
wherein the circuitry is further configured to transmit feedback data units containing, as the estimated channel and/or interference information, feedback on respective resource units and/or interference levels and/or channel feedback information on one or more resource units.

34. Second station as defined in embodiment 33,
wherein the circuitry is configured to transmit the feedback data units with orthogonal training sequences over a bandwidth larger than the bandwidth on which the following data part is transmitted.

35. Second station as defined in any one of embodiments 30 to 34,
wherein the circuitry is further configured to
listen to sounding intervals of an access point different than the one to which they are associated, in particular based on a request from a second access point or based on spatial reuse eligible training,
estimate channel or interference information, in particular based on the training data unit,
monitor the channel for packets sent with spatial reuse eligible indication, and
report channel and interference levels for requested beamforming session indices or for beamforming session indices for which interference is below predefined threshold.

36. Second station as defined in any one of embodiments 30 to 35,
wherein the circuitry is further configured to determine, based on SIG fields of the training data unit, beamforming related information, in particular a number of estimation sequences and/or the type of antenna to stream mapping, to allow correct estimation of the channel and/or interference levels.

37. Second station as defined in any one of embodiments 30 to 36,
wherein the circuitry is further configured to transmit PPDUs with orthogonal training sequences over a bandwidth larger than the bandwidth on which they send the subsequent data part.

38. Method for use by a first access point comprising
performing a sounding procedure with one or more first stations associated with the first access point and configured to communicate with the first access point over a respective channel to determine resource unit allocation and beamforming configuration for use in subsequent communication with respective first stations; and
transmitting a training data unit containing signaling information related to the determined resource unit allocation and related to the determined beamforming configuration, wherein the training data unit is transmitted with a beamforming configuration derived from the determined resource unit allocation and the determined beamforming configuration.

39. Method for use by a second access point comprising
listening to response data units transmitted by one or more first stations associated with a first access point and configured to communicate with the first access point over a respective channel, the response data units being transmitted by the one or more first stations in a sounding procedure performed by the first access point with the one or more first stations;
estimating the respective channels using received response data units;
listening to a training data unit transmitted by the first access point, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
determining, based on the signaling information contained in a received training data unit, a resource unit allocation and beamforming configuration for use in subsequent communication with one or more second stations associated with the second access point.

40. Method for use by a second station comprising
listening to a training data unit transmitted by a first access point to which one or more first stations are associated for communicating with the first access point over a respective channel, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration;
estimating channel and/or interference information based on a received training data unit;
transmitting the estimated channel and/or interference information to a second access point with which the second station is associated to communicate over a channel.

41. A non-transitory computer-readable recording medium that stores therein a computer program product, which, when executed by a processor, causes the method according to embodiment 38, 39 or 40 to be performed.

42. A computer program comprising program code means for causing a computer to perform the steps of said method according to embodiment 38, 39 or 40 when said computer program is carried out on a computer.

The invention claimed is:
1. A first access point comprising:
circuitry configured to:
perform a sounding procedure only with one or more first stations associated with the first access point and configured to communicate with the first access point over a respective channel to determine resource unit allocation and beamforming configuration for use in subsequent communication with respective first stations; and
transmit a training data unit containing signaling information related to the determined resource unit allocation and related to the determined beamforming configuration, wherein the training data unit is transmitted with a beamforming configuration derived from the determined resource unit allocation and the determined beamforming configuration.

2. The first access point as claimed in claim 1,
wherein the signaling information contains an identifier, indicating that a destination of the training data unit is one or more second access points and/or second stations associated with a second access point and not associated with the first access point or a broadcast group, or
wherein the signaling information includes information on one or more of the resource unit allocation, the beamforming configuration, a number of channel estimation sequences, a type of channel estimation sequences, an indication of a training packet, and an indication if spatial reuse is allowed during data transmission with beamforming or session index parameters as indicated in the signaling information.

3. The first access point as claimed in claim 1,
wherein the training data unit contains a session index indicating one or more of the beamforming configuration, identifiers of intended first stations, the resource unit allocation used by the first access point, and one or more transmission parameters, and/or
wherein the training data unit contains a MAC frame carrying information on one or more MIMO configurations and a resource unit allocation for one or more sets of the one or more first stations associated with the first access point and configured to communicate with the first access point over a respective channel.

4. The first access point as claimed in claim 1, wherein the circuitry is configured to perform the sounding procedure by:
transmitting a null data packet announcement;
transmitting one or more null data packets;
requesting feedback from the one or more first stations on respective resource units; and
receiving feedback data units transmitted by the one or more first stations.

5. The first access point as claimed in claim 4,
wherein the circuitry is configured to receive the feedback data units transmitted by the one or more first stations using the respective resource units for transmitting the requested feedback and using a channel bandwidth indicated in the null data packet announcement for transmitting estimation sequences, and/or
wherein the circuitry is configured to indicate in the null data packet announcement one or more of a start of a sounding interval for a spatial reuse eligible transmission, bandwidth information to be used in a following sounding, and the transmission of the training data unit, and/or wherein the circuitry is configured to transmit the training data unit a time period after receiving the feedback data units or within an interval of the sounding procedure or at a last segment of the interval of the sounding procedure.

6. The first access point as claimed in claim 1, wherein the circuitry is configured to perform the sounding procedure by:
transmitting a trigger to request a response from the one or more first stations, the trigger containing information on resource allocation for the respective first stations and one or more of a number of training sequences, a number of streams per resource unit, an identifier of which orthogonal sequences are to be used by the respective first stations, transmit power requirements for the respective first stations, and information that spatial reuse is allowed or not on future transmissions; and
receiving response data units transmitted by the one or more first stations based on the information contained in the trigger.

7. The first access point as claimed in claim 1, wherein the circuitry is configured to transmit the training data unit containing signaling information as part of data communication with the one or more first stations or to transmit, after performing the sounding procedure, a physical protocol data unit to the one or more first stations, said physical protocol data unit comprising a session index, training sequences, and data to be transmitted to the respective first stations.

8. A second access point comprising:
circuitry configured to:
listen to response data units transmitted by one or more first stations associated with a first access point and configured to communicate with the first access point over a respective channel, the response data units being transmitted by the one or more first stations in a sounding procedure performed by the first access point only with the one or more first stations;
estimate the respective channels using received response data units;
listen to a training data unit transmitted by the first access point, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration; and
determine, based on the signaling information contained in a received training data unit, a resource unit allocation and beamforming configuration for use in subsequent communication with one or more second stations associated with the second access point.

9. The second access point according to claim 8, wherein the circuitry is configured to:
determine if spatial reuse is possible and compute beamforming weight vectors such that no interference is created, and
transmit data to the one or more second stations during a transmission opportunity of the first access point, for which the second access point has determined that the spatial reuse is possible.

10. The second access point according to claim 8, wherein the circuitry is further configured to:

request feedback from the one or more second stations on resource units and/or interference levels and/or request channel feedback information on one or more resource units by transmitting a trigger including information about one or more of resource units potentially usable for a subsequent communication, resource units for which feedback is requested, and a format of the requested feedback; and
receive feedback data units transmitted by the one or more second stations, the received feedback data units containing the requested feedback.

11. The second access point according to claim 9, wherein the circuitry is configured to transmit an acknowledgement to the one or more second stations for use in a subsequent communication with the second access point, the acknowledgement indicating one or more of a session index, the one or more second stations which are allowed to use spatial reuse resources, the resource unit allocation, the beamforming configuration, and an acknowledgement behavior.

12. The second access point according to claim 8, wherein the circuitry is configured to communicate with the one or more second stations using respective beamforming configurations that do not create interference towards the one or more first stations, for which the resource unit allocation and beamforming configuration has been determined.

13. A second station comprising:
circuitry configured to:
listen to a training data unit transmitted by a first access point to which one or more first stations are associated for communicating with the first access point over a respective channel, the training data unit containing signaling information related to resource unit allocation and related to beamforming configuration determined by the first access point for use in subsequent communication by the first access point with only the one or more first stations, wherein the training data unit is transmitted with a beamforming configuration derived from the determined resource unit allocation and the determined beamforming configuration;
estimate channel and/or interference information based on a received training data unit; and
transmit the estimated channel and/or interference information to a second access point with which the second station is associated to communicate over a channel.

14. The second station according to claim 13, wherein the circuitry is further configured to:
monitor a channel for training data units transmitted with an indication that sounding is for a future spatial reuse eligible transmission; and
report estimated channel and interference information for session indices, requested by the second access point or for session indices for which interference is below a predefined threshold, a session index indicating the beamforming configuration, or a function of the beamforming configuration used by the first access point.

15. The second station according to claim 13, wherein the circuitry is further configured to determine, based on the signaling information contained in the training data unit, beamforming related information used for estimating the channel and/or interference information.

16. The second station according to claim 13, wherein the circuitry is further configured to transmit feedback data units containing, as the estimated channel and/or interference information, feedback on respective resource units and/or interference levels and/or channel feedback information on one or more resource units.

17. A method for use by a first access point comprising:
performing a sounding procedure with only one or more first stations associated with the first access point and configured to communicate with the first access point over a respective channel to determine resource unit allocation and beamforming configuration for use in subsequent communication with respective first stations; and
transmitting a training data unit containing signaling information related to the determined resource unit allocation and related to the determined beamforming configuration, wherein the training data unit is transmitted with a beamforming configuration derived from the determined resource unit allocation and the determined beamforming configuration.

18. A method for use by a second access point comprising:
listening to response data units transmitted by one or more first stations associated with a first access point and configured to communicate with the first access point over a respective channel, the response data units being transmitted by the one or more first stations in a sounding procedure performed by the first access point only with the one or more first stations;
estimating the respective channels using received response data units;
listening to a training data unit transmitted by the first access point, the training data unit containing signaling information related to resource unit allocation and related to beamforming configuration determined by the first access point for use in subsequent communication with respective first stations, wherein the training data unit is transmitted with a beamforming configuration derived from the determined resource unit allocation and the determined beamforming configuration; and
determining, based on the signaling information contained in a received training data unit, a resource unit allocation and beamforming configuration for use in subsequent communication with one or more second stations associated with the second access point.

19. A method for use by a second station comprising:
listening to a training data unit transmitted by a first access point to which one or more first stations are associated for communicating with the first access point over a respective channel, the training data unit containing signaling information related to resource unit allocation and related to beamforming configuration determined by the first access point for use in subsequent communication by the first access point with only the one or more first stations, wherein the training data unit is transmitted with a beamforming configuration derived from the determined resource unit allocation and the determined beamforming configuration;
estimating channel and/or interference information based on a received training data unit; and
transmitting the estimated channel and/or interference information to a second access point with which the second station is associated to communicate over a channel.

20. A non-transitory computer-readable recording medium that stores therein a computer program product, which, when executed by a processor, causes the method according to claim 17, 18, or 19 to be performed.

* * * * *